United States Patent [19]
Takashima

[11] 3,892,561
[45] *July 1, 1975

[54] COMPOSITION FOR TREATING STEELS

[75] Inventor: Masaru Takashima, Tokyo, Japan

[73] Assignee: Aikoh Company, Ltd., Japan

[ * ] Notice: The portion of the term of this patent subsequent to Feb. 11, 1992, has been disclaimed.

[22] Filed: Feb. 12, 1973

[21] Appl. No.: 331,871

[30] Foreign Application Priority Data
Feb. 28, 1972   Japan............................... 47-020819

[52] U.S. Cl. ........................... 75/58; 75/53; 75/94; 148/26
[51] Int. Cl....... C21c 7/00; C22b 9/10; B23k 35/34
[58] Field of Search ............... 75/53, 58, 94; 148/26

[56] References Cited
UNITED STATES PATENTS

| | | | |
|---|---|---|---|
| 2,731,373 | 1/1956 | Wasserman | 148/26 |
| 2,805,178 | 9/1957 | Gariott | 148/26 |
| 2,814,559 | 11/1957 | Clark | 75/53 |
| 3,031,346 | 4/1962 | Wasserman | 148/26 |
| 3,269,828 | 8/1966 | Hale | 75/53 |
| 3,269,828 | 8/1966 | Hale | 75/58 |
| 3,272,667 | 9/1966 | Siegle | 148/26 |
| 3,621,188 | 11/1971 | Joseph | 148/26 |

Primary Examiner—L. Dewayne Rutledge
Assistant Examiner—Peter D. Rosenberg
Attorney, Agent, or Firm—Wenderoth, Lind & Ponack

[57]  ABSTRACT

A composition for treating molten steel comprising 2 to 40 wt.% of lithium fluoride, 60 to 98 wt.% of sodium fluoride and up to 38 wt.% of calcium fluoride and having a melting point between 600° and 950°C.

2 Claims, No Drawings

COMPOSITION FOR TREATING STEELS

The present invention relates to a novel composition for treating molten steel which is effective to clean molten steel, particularly Al-killed and semi-killed molten steel prepared in various steel making furnaces, and is added to the molten steel during tapping and/or ingot making steps. As compared with conventional compositions used for similar purposes, the present composition has remarkably enhanced cleaning effects and contributes to improve yield of steel ingot production.

Further the present composition is useful for production of various carbon steels, alloy steels, stainless steels and high alloyed steels, and remarkably reduces both interior defects and surface defects of steel materials thus greatly improving yield of steel products.

Regarding deoxidation of molten steel and removal of non-metallic inclusions, there are many prior publications, for example, U.S. Pat. No. 3,269,828. But effects and results obtained by the prior art vary, largely depending on their methods, types of additives, or treating agents and their chemical analysis.

One of the objects of the present invention is to provide a novel composition for treating various kinds of steels.

The basic composition according to the present invention comprises:
2 to 40 wt.% of lithium fluoride
60 to 98 wt.% of sodium fluoride
up to 38 wt.% of calcium fluoride and has a melting point between 600° and 950°C, containing less than 6 wt.% of the total impurities of silica and alumina, and having a particle size under 40 mesh.

A modified composition according to the present invention comprises:
2 to 40 wt.% of lithium fluoride
60 to 98 wt.% of sodium fluoride
up to 38 wt.% of calcium fluoride
not more than 3 wt.% of hexaflurotitanic acid potassium; and/or
not more than 3 wt.% of celium fluoride and has a melting point between 600° and 950°C, containing less than 6 wt.% of the total impurities of silica and alumina, and having a particle size under 40 mesh.

In a further modification, fluorides of rare earth elements or misch metal powders may be added in place of celium fluoride.

In case of Al-killed and semi-killed molten steel, various kinds of non-metallic inclusions are caused by entrapment of furnace slag during the teeming operation, secondary oxidation of the molten steel in the air, the ladle reaction between molten steel and refractories and the melt down of refractories during the bottom-pouring ingot making operation. These non-metallic inclusions contain A type inclusions such as sulfides and silicates, B type granular inclusions such as alumina inclusions discontinuously grouping in the hot working direction, and C type inclusions such as granular oxides irregularly dispersed and not deformed by the hot working.

These inclusions cause cracking during the rolling or forging of the steel and deteriorate the mechanical properties of the steel, and particularly B type and C type inclusions cause fractures or fatigue ruptures of the steel products in service.

In order to eliminate the causes of the above defects, it is necessary to float and remove the non-metallic inclusions formed in the molten steel. It has been found that this object can be achieved by introducing oxides which are able to combine with the formed oxides into the molten steel in the ladle or during the ingot-making process to produce low melting point coagulates by the reaction between the oxides. Then by adding compositions which generate suitable gassing, collision action among the inclusions is intensified, thus accelerating the coagulation speed and enlargement of the coagulates, in turn increasing the flotation of inclusions according to the floatation principle.

As a result of the above studies and research, it has been confirmed that lithium oxide, which has larger coagulation action with respect to the oxides in the molten steel, is very useful; and for the source of the lithium oxide, a low melting point lithium fluoride has been selected. The lithium fluoride easily reacts with oxygen in the molten steel and forms lithium oxide which is an oxide having highly activated energy, and reacts with alumina and oxides formed in the molten steel and forms low melting point complexes and coagulates.

Sodium fluoride is also a low melting point fluoride and generates suitable gassing at the temperature of molten steel and is useful for a gas generating source for increasing the flotation power of coagulated oxides.

Further, in order to adsorb and fix the floating oxides, it is necessary to provide a molten slag layer. For this purpose, calcium fluoride which is commonly used and forms a high fluidity slag, is selected in the present invention.

The reaction which contributes to the removal of the non-metallic inclusions by bondage of oxides may be expressed as $$LiF + O \rightarrow Li_2O + F^-$$

and some of the coagulated oxides are:

$Li_2O - Al_2O_3$
$Li_2O - Al_2O_3 - SiO_2$
$Li_2O - $ Manganese alumino-silicate.

The non-metallic inclusions which have been given coagulation ability are absorbed and fixed by the complex molten slag as the floating power is increased by the gas from sodium fluoride as well as by the vapour pressure of lithium fluoride and calcium fluoride.

Now, the reasons of limiting the compositions and the melting points as above will be explained below.

Less than 2 wt.% of lithium fluoride is not enough for producing $Li_2O$ which forms neuclei of the oxide coagulation, and on the other hand more than 40 wt.% of lithium fluoride produces excessive $Li_2O$ and destroys its precipitation balance.

Although even 15 to 20 wt.% of sodium fluoride is effective, in order to lower the initial melting temperature of the present composition, and in view of the total slag amount effective for maximum coagulation flotation effects as well as for improvement of the surface of steel ingots to be obtained, 60 to 98 wt.% of sodium fluoride is employed in the present invention.

The amount of calcium fluoride should be proportionate to the formation of the molten slag layer necessary for adsorbing and fixing the floating oxides.

Conventionally in the steel industry, it has been common practice to use various slag-forming substances or covering substances so as to form a molten slag zone over the molten steel for the purpose of maintaining the temperature of the molten steel within the mold or covering the molten steel. Therefore, the amount of calcium fluoride used for the composition of the present invention may be determined so as to satisfy the ingot-making conditions. On the other hand, a large amount of calcium fluoride should be avoided in order to lower the initial melting temperature of the slag. Thus up to 38 wt.% of calcium fluoride is used in the present invention in view of the total slag amount effective to improve the steel ingot surface.

Further, the proportions of the components are also adjusted in relation to the melting point of the composition.

In order to strictly adjust the melting point of the composition of the present invention, it is desirable to limit the impurities contained in the substances used for the present composition. Normally, raw calcium fluoride material contains 3 to 10 wt.% of $SiO_2$ and 3 to 5 wt.% of $Al_2O_3$ as harmful impurities, and raw lithium fluoride material contains 1 to 2 wt.% of $Al_2O_3$ as harmful impurity. These impurities hinder proper adjustment of the melting point of the composition, thus lowering the working effects of the composition. In the present invention, all of the component substances of the composition are refined and the harmful impurities of fluorides to be used are limited less than 3 wt.% of $SiO_2$ and less than 3 wt.% of $Al_2O_3$ so as to assure that the total amount of $SiO_2$ and $Al_2O_3$ in the final composition is less than 6 wt.%.

Further, the particle size of the composition is limited to below 40 mesh in order to assure rapid melting and uniform melting speed of the composition when added to the molten steel.

In the modified composition of the present invention, hexafluoro titanic acid potassium is added to the basic composition as hereinbefore stated. This additional component is effective to aid desulfurization of the molten steel and has a low melting point of about 780°C and yet is lower in price than lithium fluoride. Thus it is useful for fine adjustment of the melting point of the composition. This effect can be attained satisfactorily with less than 3% thereof.

Deoxidation and desulfurization effects of cerium fluoride and its affinity with non-metallic inclusions such as $Al_2O_3$ and $SiO_2$ in molten steel have been already recognized in the art.

According to the present invention, cerium fluroide is added for the purpose of supplementary adjustment of the cleanliness of the molten steel in an amount not more than 3% to control precipitation of cerium oxide. The melting point of cerium fluoride is about 1330°C.

Further, the components of the composition according to the present invention are selected so as to have a melting point within a range of 600° – 950°C. The melting points of simple fluorides are:

LiF — 845°C, NaF — 990°C and $CaF_2$ — 1418°C
and the eutectic temperatures of binary systems are:
LiF—NaF — 652°C, LiF—$CaF_2$ — 773°C and
NaF—$CaF_2$ — 818°C
and the ternary system of LiF—NaF—$CaF_2$ shows a lower eutectic temperature of 615°C.

The mixture containing the above fluorides is divided into an appropriate particle size under 40 mesh and is mechanically mixed uniformly and is added to molten steel in the form of powder, granules or briquettes.

The proportions of components of the composition according to the present invention are changed or adjusted in view of the amount of oxygen remaining in the molten steel which differs depending on the steel grades or types such as low-carbon steel grades, middle-carbon steel grades and high-carbon steel grades. The range of melting point of the composition is defined broadly enough to cover the cases when low-melting point $CeF_3$ or $K_2TiF_6$ is added.

The specific gravity of the composition of the present invention is desirably about 1.0 depending on the mixing proportion, and the viscosity is desirably about 0.15 poise at 1300°C.

The cleaning effects attained by addition of the composition of the present invention include deoxidation of molten steel, removal of non-metallic inclusions and improvement of ingot surfaces as well as desulfurization and removal of hydrogen.

Among the above effects, deoxidation and removal of non-metallic inclusions by the composition of the present invention are as stated above.

The composition added to molten steel forms molten slag having a low melting point and low viscosity, and rises together with the molten steel, covering the top surface of the molten steel in the mold during the teeming, and flows downs along the inside wall of the mold in a curtain-like form so that a smooth surface of steel ingot is obtained.

Further, LiF, NaF and $CaF_2$ contained in the composition react with sulfur in the molten steel to form $Li_2S$, $Na_2S$ and CaS and thus desulfurization effect is obtained. Further, remarkable desulfurization effect is obtained when $CeF_3$ is further added.

Also, as the gas generating from the fluoride components of the composition rises, H gas enriched during the steel making, tapping and ingot making steps is also taken up together with the gas, and thus the hydrogen gas content is reduced.

The composition of the present invention is added to molten steel in the following manners and amounts.

In case of bottom-pouring ingot making, the composition is added to the molten steel in an amount of 150 to 1000g per one metric ton of molten steel, and in case of top-pouring ingot-making, the composition is added in an amount of 300 to 1000g per one metric ton of molten metal. The addition of the composition may done by putting part thereof within the mold or the pourer before the molten steel is poured in an amount of 150 to 300g per one ton of molten steel, and adding the remaining part as required in the mold after the pouring is started, or the composition may be added to the stream of molten metal successively. In either way, the addition of the composition is completed before about half of the molten steel is poured.

The amount of the composition to be added before the pouring is determined by taking into consideration the method of ingot making and the size of ingots to be obtained.

The composition of the present invention can be added in a divided manner to tandishes for continuous steel casting and similar desirable results are obtained.

The composition of the present invention is applicable for treating various kinds of steels, and its chemical analysis is changed depending on the kinds of steel to be treated. Preferred chemical analyses of the present composition are set forth under.

1. For treating AISI 1040 carbon steel: LiF 4.5 to 5.5 wt.%, NaF 72.0 to 74.0 wt.% $CaF_2$ 21.0 to 23.0 wt.%

2. For treating AISI 302 stainless steel: LiF 31.5 to 32.5 wt.%, NaF 67.0 to 69.0 wt.%

3. For treating AISI 51100 bearing steel: LiF 5.5 to 6.5 wt.%, NaF 82.0 to 84.0 wt.% CaF$_2$ 9.0 to 11.0 wt.%

The above compositions may further comprises 1.0 wt.% of K$_2$TiF$_6$ and/or CeF$_3$.

The examples of the present invention are shown in Tables 1 and 2.

Table 1 shows the chemical analysis of examples of the present composition; and Table 2 shows results obtained when the present composition is used in comparison with results obtained when the present composition is not used.

Test samples were prepared from 60 mm diameter steel bars rolled from a 6 ton steel ingot, and the estimation was made based on the cleanness (JIS: Spot calculation method, number of viewed fields: 60 × 400) of the steel according to the JIS microscopic testing method for non-metallic inclusions.

The results clearly show that the non-metallic inclusions in the steel are remarkably reduced when the present composition is used.

By comparison of these results, it is understood that remarkable improvement can be obtained by addition of the present composition. Further, the surface of the steel ingot made with addition of the present composition was much smoother and finer than that of the ingot made without the addition of the present composition.

Table 1

Chemical Analysis in wt.% of Compositions

| Example No. | LiF | NaF | CaF$_2$ | K$_2$TiF$_6$ | CeF$_3$ |
|---|---|---|---|---|---|
| 1 | 5.0 | 73.0 | 22.0 | — | — |
| 2 | 32.0 | 68.0 | — | — | — |
| 3 | 6.0 | 83.0 | 10.0 | 1.0 | — |
| 4 | 3.0 | 90.0 | 6.0 | — | 1.0 |

Table 2

Cleanness in % of Steels

| Test No. | Steel Grade | No Addition of Composition | | Addition of Composition | |
|---|---|---|---|---|---|
| | | A type | B+C type | A type | B+C type |
| 1 | S40C | 0.12 | 0.08 | 0.018 | 0.009 |
| 2 | SUS40B | 0.13 | 0.19 | 0.015 | 0.012 |
| 3 | SUJ3 | 0.10 | 0.09 | 0.020 | 0.010 |
| 4 | SCM3 | 0.09 | 0.10 | 0.021 | 0.012 |

(JIS Spot calculation method number of viewed fields 60, × 400)

What is claimed is:

1. A composition for treating molten steel consisting essentially of 2 to 40 wt. % lithium fluoride, 60 to 98 wt. % sodium fluoride, 6 to 38 wt. % calcium fluoride, 1 to 3 wt. % of K$_2$TiF$_6$, said composition having a melting point between 600° and 950°C.

2. A composition according to claim 1 which has a particle size under 40 mesh.

* * * * *